US011987480B2

(12) United States Patent
Rusiniak

(10) Patent No.: US 11,987,480 B2
(45) Date of Patent: May 21, 2024

(54) CABLE GUIDE DEVICE

(71) Applicant: KANISTER INDUSTRIES LLC, Cheektowaga, NY (US)

(72) Inventor: Daniel Rusiniak, Depew, NY (US)

(73) Assignee: KANISTER INDUSTRIES LLC, Cheektowaga, NY (US)

(*) Notice: Subject to any disclaimer, the term of this patent is extended or adjusted under 35 U.S.C. 154(b) by 68 days.

(21) Appl. No.: 17/075,194

(22) Filed: Oct. 20, 2020

(65) Prior Publication Data

US 2021/0061626 A1 Mar. 4, 2021

Related U.S. Application Data

(60) Provisional application No. 62/925,189, filed on Oct. 23, 2019.

(51) Int. Cl.
*B66D 1/36* (2006.01)

(52) U.S. Cl.
CPC ........ *B66D 1/36* (2013.01); *B66D 2700/0191* (2013.01)

(58) Field of Classification Search
CPC .... B66D 3/26; B66D 2700/0191; B66D 1/36; B66D 1/38
USPC .......................................................... 254/327
See application file for complete search history.

(56) References Cited

U.S. PATENT DOCUMENTS 190,811 A * 5/1877 Bevelander ........ B65H 75/4402 242/397.2
523,577 A * 7/1894 Ivens ................ B65H 75/4407 254/285
969,873 A * 9/1910 Isaac ........................ B66D 1/36 254/416
1,092,714 A * 4/1914 Holmes .................... B66D 1/36 254/398
1,103,055 A * 7/1914 King et al. ............... B66D 1/36 254/398

(Continued)

FOREIGN PATENT DOCUMENTS

CH 666472 A5 * 7/1988 ............... B66D 1/38
CH 673274 A5 * 2/1990 ............... B66D 1/50

(Continued)

*Primary Examiner* — Michael R Mansen
*Assistant Examiner* — Henrix Soto
(74) *Attorney, Agent, or Firm* — Simpson & Simpson, PLLC

(57) ABSTRACT

A cable guide device, including a cable with one end attached to an unwinding/rewinding device, another end having structure for accepting applied force, with cable therebetween guided by a cable guide, wherein as force is applied to the cable, the cable guide causes redirection of the applied force eliminating cable binding as cable is rewound. One embodiment is a trunnion-sheave winch-apparatus for object recovery, including: a trunnion-sheave of a pair of sheaves with cable inserted therebetween, one cable end attached to a winch drum with a hook attached to its other end for connection to an object being recovered, wherein as the object is recovered the force applied to the cable is redirected by the trunnion-sheave causing said cable to be maintained at a minimum of 90° contact with the pair of sheaves regardless of the angle of force being applied to the cable causing elimination of cable binding.

5 Claims, 6 Drawing Sheets

(56) References Cited

U.S. PATENT DOCUMENTS

| | | | | | |
|---|---|---|---|---|---|
| 2,249,117 | A * | 7/1941 | Crandall | B66D 1/38 | 242/157.1 |
| 2,256,982 | A * | 9/1941 | Lawler | B66D 1/36 | 254/336 |
| 2,275,192 | A * | 3/1942 | Bailey | B21C 47/003 | 318/432 |
| 2,336,684 | A * | 12/1943 | Hendrickson | B66D 1/36 | 242/157.1 |
| 2,344,417 | A * | 3/1944 | Schmidt | B66D 1/36 | 254/326 |
| 2,453,184 | A * | 11/1948 | Berry | B66D 1/36 | 242/157.1 |
| 2,473,628 | A * | 6/1949 | Allison | B66D 1/36 | 242/157.1 |
| 2,738,938 | A * | 3/1956 | Benson | B66D 1/36 | 242/157.1 |
| 3,069,107 | A * | 12/1962 | Hirt | B65H 59/04 | 242/561 |
| 3,222,008 | A * | 12/1965 | Purzycki | B65H 16/00 | 242/422.4 |
| 3,228,624 | A * | 1/1966 | Brinkman | B65H 59/04 | 242/422.8 |
| 3,446,452 | A * | 5/1969 | Tetens | B21C 47/003 | 242/422.8 |
| 3,687,385 | A * | 8/1972 | Skalleberg | B65H 57/26 | 242/397.2 |
| 3,688,999 | A * | 9/1972 | Plattner | B65H 23/06 | 242/422.8 |
| 3,912,230 | A * | 10/1975 | Learmont | B66D 1/36 | 254/285 |
| 3,963,191 | A * | 6/1976 | Goodley | B65H 16/04 | 242/417.3 |
| 4,015,798 | A * | 4/1977 | Benya | B66D 1/38 | 242/482.6 |
| 4,241,884 | A * | 12/1980 | Lynch | B65H 49/34 | 241/73 |
| 4,456,193 | A * | 6/1984 | Westover | B41J 15/04 | 242/563.2 |
| 4,566,646 | A * | 1/1986 | Benjamin | B65H 59/385 | 242/413.5 |
| 4,778,121 | A * | 10/1988 | Minnee | B66D 1/38 | 242/157.1 |
| 4,899,945 | A * | 2/1990 | Jones | B65H 59/387 | 242/422.3 |
| 4,905,927 | A * | 3/1990 | Lesse | B65H 23/063 | 242/422.4 |
| 5,277,373 | A * | 1/1994 | Morton | B65H 59/385 | 242/413.5 |
| 5,310,124 | A * | 5/1994 | Linari | H02K 15/09 | 318/6 |
| 5,803,393 | A * | 9/1998 | Julian | B65H 59/382 | 242/420.6 |
| 5,927,693 | A * | 7/1999 | Hackl | B66D 1/00 | 254/326 |
| 6,811,112 | B1 * | 11/2004 | Currie | B65H 54/2872 | 242/548.1 |
| 7,118,094 | B2 * | 10/2006 | McDaniel | B66D 1/36 | 254/335 |
| 7,287,717 | B2 * | 10/2007 | Ropers | B65H 59/04 | 242/419.9 |
| 8,276,884 | B2 * | 10/2012 | Rusiniak | B66D 1/00 | 254/323 |
| 8,616,529 | B2 * | 12/2013 | Kim | B66D 1/50 | 254/335 |
| 10,315,894 | B2 * | 6/2019 | Anderson | B66D 1/38 | |
| 2004/0069981 | A1 * | 4/2004 | Pelletier | E01H 4/02 | 254/385 |
| 2005/0230670 | A1 * | 10/2005 | Kataoka | B66D 3/26 | 254/335 |
| 2005/0258302 | A1 * | 11/2005 | McDaniel | B66D 1/36 | 242/615.2 |
| 2008/0131247 | A1 * | 6/2008 | Nespor | B66D 3/006 | 254/386 |
| 2011/0168961 | A1 * | 7/2011 | Christiansen | B66D 1/00 | 254/327 |
| 2012/0175576 | A1 * | 7/2012 | Xydias | B66D 1/36 | 254/335 |
| 2013/0181177 | A1 * | 7/2013 | Moll | B66D 1/30 | 254/338 |
| 2019/0263642 | A1 * | 8/2019 | Hainsworth | B66D 1/365 | |
| 2020/0017338 | A1 * | 1/2020 | Hall | B65H 59/40 | |
| 2020/0115201 | A1 * | 4/2020 | Maghsoodi | B66D 1/28 | |
| 2020/0207592 | A1 * | 7/2020 | Hall | B66D 1/36 | |
| 2020/0385248 | A1 * | 12/2020 | Reid | B66D 1/12 | |
| 2021/0362986 | A1 * | 11/2021 | Lindberg | B66C 7/02 | |

FOREIGN PATENT DOCUMENTS

| | | | | |
|---|---|---|---|---|
| CN | 107473117 | A * | 12/2017 | |
| CN | 108408621 | A * | 8/2018 | B66D 1/14 |
| EP | 875483 | A2 * | 11/1998 | B66D 1/00 |
| EP | 1405818 | A1 * | 4/2004 | B66D 1/36 |
| EP | 2962980 | A1 * | 1/2016 | B66D 1/38 |
| EP | 3040305 | A1 * | 7/2016 | B66D 1/38 |
| FR | 2552412 | A * | 3/1985 | B65H 54/2848 |
| FR | 2698856 | A1 * | 6/1994 | B66D 1/38 |
| FR | 3000733 | A1 * | 7/2014 | B66D 1/36 |
| GB | 779312 | A * | 7/1957 | |
| GB | 817476 | A * | 7/1959 | |
| GB | 2434352 | A * | 7/2007 | B66D 1/36 |
| KR | 1799377 | B1 * | 11/2017 | B66D 1/38 |
| WO | WO-2014096946 | A1 * | 6/2014 | B66D 1/38 |
| WO | WO-2016067127 | A1 * | 5/2016 | B66D 1/38 |

* cited by examiner

CABLE GUIDE DEVICE

CROSS-REFERENCE TO RELATED APPLICATIONS

This Application claims the benefit of Provisional Application No. 62/925,189 filed Oct. 23, 2019.

STATEMENT REGARDING FEDERALLY SPONSORED RESEARCH OR DEVELOPMENT

Not Applicable

REFERENCE TO SEQUENCE LISTING, A TABLE OR A COMPUTER PROGRAM LISTING COMPACT DISK APPENDIX

Not Applicable

BACKGROUND

The present invention relates generally to recovery-devices and their cable-winch-assemblies and, more particularly, to a cable guide device that eliminates binding of the cable. A specific, non-limiting, example of a cable guide device is a recovery-device fitted with a power-driven trunnion-sheave winch-apparatus, of the present invention, to recover an object, regardless of how that object is positioned with reference to the recovery-device, without winch-cable binding. The trunnion-sheave winch-apparatus consists of a minimal number of parts that are securely fastened to and housed within a protecting support, such as an otherwise standard heavy-duty recovery-device support. This invention is meant to be used in a number of ways, including towing and recovery, repossession, pulling up an anchor, boat recoveries, lifting heavy objects, and fire rescue recovery, for example.

The background information discussed below is presented to better illustrate the novelty and usefulness of the present invention. This background information is not admitted prior art.

Winch fitted recovery-devices have been used for many years to move large and heavy objects, such as stranded vehicles. In a typical application, one end of a long wire rope (the winch-cable) is securely attached to the object to be recovered while the other end is attached to and wound around a winch-drum of the recovery-device. The winch-cable is then rotated about the winch-drum to lift and/or move the object that is too heavy to move or lift manually, such as vehicles that cannot move under their own power. In general, a winch-apparatus typically includes a high torque motor for rotating the winch-drum to wind and unwind the winch-cable. This motor can be, for example, a hydraulic motor, or an electric motor with high torque gear reduction. Turning the winch-drum in the appropriate direction, once the winch-cable is attached to the object to be recovered, rewinds the winch-cable onto the winch-drum creating a tension in the winch-cable. Frequently, however, in currently available winch fitted recovery-devices the winch-cable cannot be fed onto the winch-drum because of the binding of the winch-cable on the pins of the pulley-head requiring the winch-cable to be unwound and unbound before the winch-cable can again be wound on it drum. This process may need to be repeated several times before the winch-cable is completely wound on the winch-drum. This is not only time consuming, costly, and annoying, but also may significantly reduce the life of the cable. Additionally, and more importantly, there is always the danger that the winch-cable will break or become significantly weakened presenting a serious hazard, especially when the object to be recovered is located on an incline. This situation becomes even more dangerous when there is no way to secure in place the object being recovered. When the object being recovered cannot be secured in place, releasing the winch to unjam it could cause the object, such as a vehicle, to roll down the incline on which it is situated. In addition, the weight of the object can make it very difficult and even impossible for the winch-cable to be unjammed. A related hazard occurs when the recovery operation destabilizes the object to be recovered, in that the recovery operation can inadvertently cause the recovery vehicle to move. Such movement could be merely an inconvenience, but in certain situations, such movement could result in disaster and even death for the winch operator.

SUMMARY

In presently available cable-winch devices, such as tow trucks, the winch-cable binds on the pins of its pulley-head when the cable is pulling an object that is positioned so that the attached winch-cable is at an angle of 45° to 135° to the long axis of the front bumper-type support. And, even if the cable is pulling an object that is positioned so that the attached winch-cable is at an angle of 0° to 45° and 135° to 180° to the long axis of the front bumper-type support, there is a good chance that the winch-cable will still bind on the pins of the sheave-head.

The present inventor, after considerable thought, observation, and experimentation determined that cable binding occurs when an object being recovered (i.e., the pulling force) is at an angle to the support of the cable guide device. He realized that, in one example, cable binding is exacerbated by the fact that presently available cable-winch devices employ only a single dangling pulley to guide their winch-cables upon rewinding and that, importantly, the single, dangling pulley is unable to redirect the pulling force applied to the winch-cable as the winch-cable is being rewound about its winch. The present inventor's inventive concept is that it the direction of the pulling force that must be redirected to eliminate binding of a cable when it is being rewound. In general, the invention is a cable guide device. In a specific example of a winch recovery truck, he concluded that a single pulley, as used in presently available recovery trucks, does not have the required amount of contact with and control of the winch-cable to redirect the pulling force applied to the winch-cable as the winch-cable is being rewound.

The present invention, a cable guide device, is herein explained by using a more specific example: a trunnion-sheave winch-apparatus that directs the winch-cable through paired trunnion-sheaves to provide for a minimum winch-cable to trunnion-sheave contact of 90° no matter from which direction an object to be recovered (i.e., the pulling force) is being pulled. The use of this example in no way limits the general use of the cable guide device. In more detail, the trunnion-sheave winch-apparatus consists of paired trunnion-sheaves, each consisting of a wheel with a grooved edge having a center hole therethrough receiving a trunnion pivot. The trunnion-sheaves, attached to and supported by a trunnion-sheave head, are positioned side by side within the same plane so that the grooved edge of each sheave is adjacent to the other. The trunnion pivot of each trunnion-sheave provides for the trunnion-sheaves to rotate about an axis positioned 90° from the trunnion-sheave winch-apparatus support. The trunnion-sheaves are able to rotate in opposite directions causing the winch-cable to either travel down from the winch or up to the winch within the adjacent groves of the trunnion-sheaves. The trunnion-sheaves guide the winch-cable such that the winch-cable always has a minimum winch-cable to trunnion-sheave contact of 90°. In this way, the trunnion-sheaves redirect the pulling force on winch cable eliminating binding of the winch-cable.

The single swinging swivel-pulley of presently available cable-winch recovery devices, when in position for use, protrudes away from its supporting structure leaving it open to damage. Additionally, it is not fixedly attached to or protected by its supporting structure. Thus, for its protection, after each use the single swivel-sheave must be removed from its support and re-installed onto its support when needed for its next use. The present invention of the paired-trunnion-sheave design, as described further herein, provides for the paired-trunnion-sheaves to be rotatably and fixedly attached to their supporting structure—the trunnion-sheave-head—providing for the trunnion-sheave-apparatus of the present invention to be easily and quickly rotated into its protective storage compartment for safe storage when not in use and rotated out of it protective storage rather than being removed for storage.

Thus, the present invention of a cable guide device, comprises a cable, a cable unwinding/rewinding device, a cable guide, with one end of the cable attached to the cable unwinding/rewinding device, and the other working end of the cable having structure for accepting an applied force, wherein as force is applied to the working end of the cable, the cable guide causes redirection of the applied force eliminating cable binding as the cable is being rewound. As applied to the specific example used herein, a trunnion-sheave winch-apparatus, using the cable guide device principles, eliminates cable binding during a recovery operation. Moreover, the paired sheaves of the trunnion-sheave winch-apparatus are easily and quickly rotated out of and into their storage area. A cover over the storage area protects such a trunnion-sheave winch-apparatus from the elements.

Still other benefits and advantages of this invention will become apparent to those skilled in the art upon reading and understanding the following detailed specification and related drawings.

DEFINITIONS

Compound pulley, as used herein, is defined herein as: several connected pulley wheels in one pulley system used to increase efficiency, although the pulley wheels should be arranged so that one is just above or below each other with a fixed axle between them. It must be kept in mind that just because multiple pulley wheels lessen the force needed to move an object, it doesn't mean that dozens of pulley wheels can be used in a compound pulley because multiple pulley wheels while making the work easier, also increase the amount of friction, that reduces mechanical advantage until eventually the work is more difficult instead of easier.

Pivot, as used herein, is the central point, pin, or shaft on which a mechanism, such as a sheave, turns or oscillates.

Pulley, as used herein, is defined as follows: a pulley includes the frame, whatever attaching hardware is involved, and in terms of classical mechanics, even the rope.

Sheave, as used herein, is a grooved wheel. While the terms pulley and sheave are sometimes used interchangeably, the technical usage seems to be, that the sheave is the grooved wheel and the pulley is the system that uses the sheave. The term pulley is often used interchangeably with the word sheave. A sheave is a rotatable, grooved wheel into which a rope or cable fits into.

Trunnion, can be a cylindrical protrusion used as a mounting or pivoting point or as a pin or pivot forming one of a pair on which something is supported. Alternatively, a trunnion is a shaft that positions and supports a tilting plate. Trunnions are very specialized bearing mechanisms. Sometimes, a shaft not only has to rotate, but the apparatus connected to the shaft has to rotate as well. Other times, the shaft has to be free to move around in circular motions.

Trunnion-sheave, as used herein is a pair of grooved sheaves supported on the pivotable trunnion, where the grooves of each sheave are in the same plane and facing and adjacent to each other.

BRIEF DESCRIPTION OF THE DRAWINGS

In order that these and other objects, features, and advantages of the present invention may be more fully comprehended and appreciated, the invention will now be described, by way of example, with reference to specific embodiments thereof which are illustrated in appended drawings wherein like reference characters indicate like parts throughout the several figures. It should be understood that these drawings only depict preferred embodiments of the present invention and are not therefore to be considered limiting in scope, thus, the invention will be described with additional specificity and detail through the use of the accompanying drawings, in which.

A LIST OF REFERENCE CHARACTERS AND THE PARTS TO WHICH THEY REFER

Figure 1:
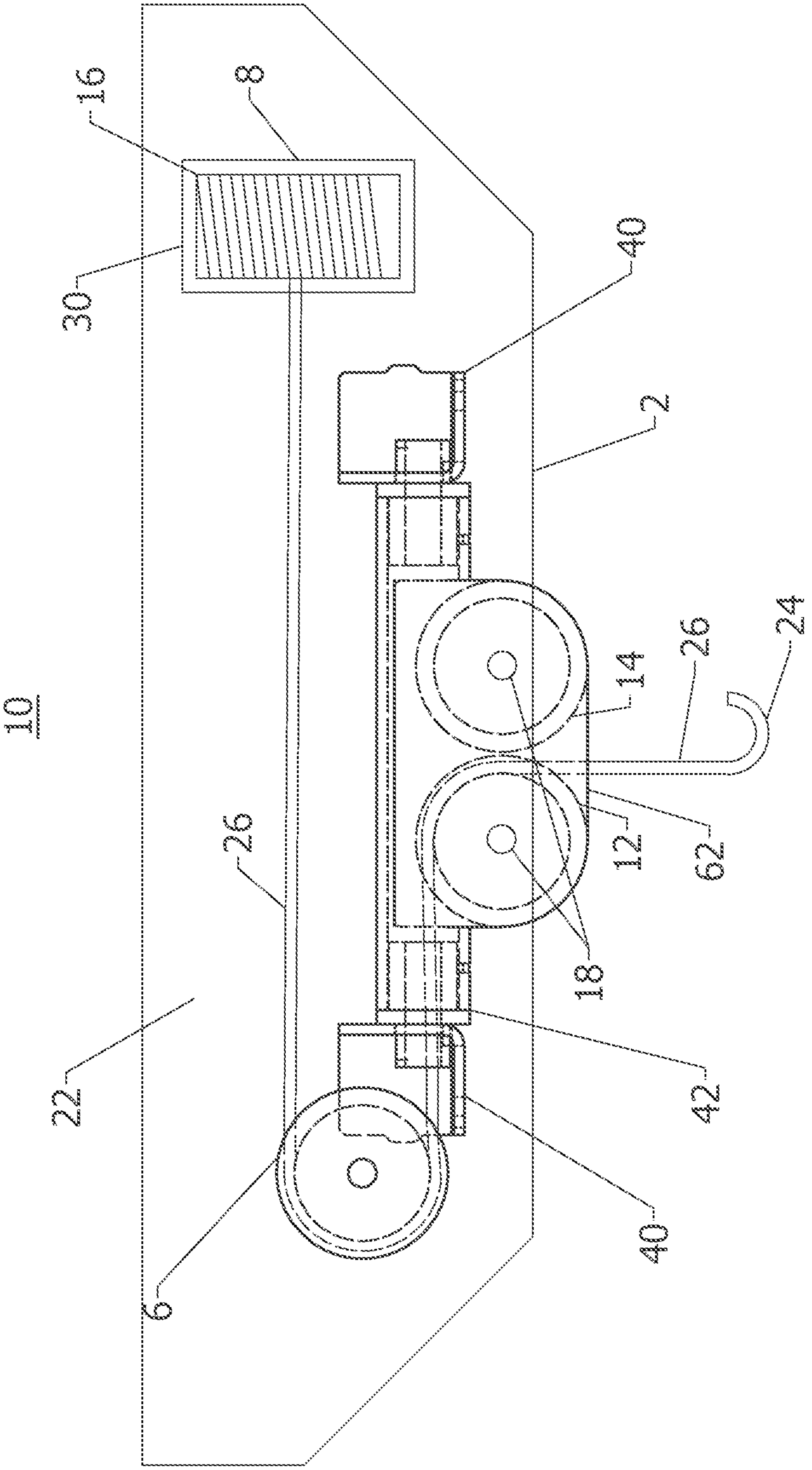
FIG. 1 is an overhead schematic view of a trunnion-sheave winch-apparatus according to the cable guide device principles of the present invention.

2 Support for housing the trunnion-sheave winch-apparatus.
6 Single sheave in its support cavity.
8 Storage space for winch-drum 16.
10 Trunnion-sheave winch-apparatus of the present invention.
12 A trunnion sheave paired with "14".
14 A trunnion sheave paired with "12"
16 Winch-drum.
18 Axis of the reversable rotatable trunnion-sheaves.
22 Storage space for trunnion-sheave winch-apparatus.
24 Hook.
26 Winch-cable.
30 Winch-apparatus.
40 Support mount for the support head pivot 42.
42 Trunnion-sheave support head pivot.
60 Cover for the trunnion-sheave winch-apparatus.

62 Support head for trunnion sheaves 12 and 14.
63 Shackle attachment point opening.
64 Shackle attachment point.
66 Winch release handle.
68 Opening handle/latch for cover 60.
70 Hinge.
72 Gas strut.

It should be understood that the drawings are not necessarily to scale. In certain instances, details which are not necessary for an understanding of the present invention or which render other details difficult to perceive may have been omitted.

DETAILED DESCRIPTION

Referring now, with more particularity, to the drawings, it should be noted that the disclosed invention is disposed to embodiments in various sizes, shapes, and forms. Therefore, the embodiments described herein are provided with the understanding that the present disclosure is intended as illustrative and is not intended to limit the invention to the embodiments described herein. The present invention is directed towards a cable guide device that incorporates the inventive concept of the inventor: the ability to control the direction of the pulling force. In general terms, the invention can be defined as an apparatus for acting on an applied force, the apparatus comprising a cable unwinding/rewinding mechanism with an attached cable having a structure for accepting an applied force and a cable-guide for controlling the direction of the applied force as the apparatus acts on the applied force.

DETAILED DESCRIPTION

Referring now, with more particularity, to the drawings, it should be noted that the disclosed invention is disposed to embodiments in various sizes, shapes, and forms. Therefore, the embodiments described herein are provided with the understanding that the present disclosure is intended as illustrative and is not intended to limit the invention to the embodiments described herein. The present invention is directed towards a cable guide device that incorporates the inventive concept of the inventor: the ability to control the direction of the pulling force. In general terms, the invention can be defined as an apparatus for acting on an applied force, the apparatus comprising a cable unwinding/rewinding mechanism with an attached cable having a structure for accepting an applied force and a cable-guide for controlling the direction of the applied force as the apparatus acts on the applied force.

As mentioned above, to describe the principles of a cable guide device, in more detail, a trunnion-sheave winch-apparatus as part of a recovery vehicle is used herein. It should be understood, however, that this does not limit the uses and application of the principles of a cable guide device. The trunnion-sheave winch-apparatus is contemplated to be power-driven but can be manually powered, if desired. The trunnion-sheave winch-apparatus according to the principles of the present invention has a minimal number of parts that are all housed within a support having a protective cover, evoking an otherwise standard, heavy-duty support, such as a wooden, steel, plastic or the like, vehicle bumper. A single sheave, pair of trunnion-sheaves with their support head, pivotable support mount for the trunnion-sheaves, support mount for the pivotable support mount, winch-drum, and winch-cable of the trunnion-sheave winch-apparatus are all positioned within, in this example, the upward facing surface of the trunnion-sheave winch-apparatus support. The pair of trunnion-sheaves of the winch-apparatus guide the winch-cable so that as the winch-cable is brought into play (i.e., being rewound) it always maintains at least a minimum of 90° contact with the pair of trunnion-sheaves causing the winch-apparatus to recover an object, regardless of how the object is positioned with reference to the recovery device, without binding of the winch-cable upon rewinding.

Turning now to the drawings, FIG. 1 illustrates a top-down schematic view of a favored embodiment of the cable guide device invention, a trunnion-sheave winch-apparatus 10 according to the principles of the present invention. Trunnion-sheave winch-apparatus 10, with its principles derived from the cable guide device, is contemplated for use on any machine or device that is used for lifting, lowering or pulling. For exemplary purposes, which are not to be taken as limiting, the embodiment discussed below is focused on the invention's use on a tow truck, which includes, but is not limited to wreckers, breakdown trucks, recovery trucks or lorries. Heavy duty support 2, that is this example is made from steel, aluminum, or any other material that offers the required strength and endurance, is illustrated as adapted for supporting and protectively housing trunnion-sheave winch-apparatus 10 including, in this example, a remotely, hydraulically-powered winch 30, a single sheave 6, mount 40, trunnion-sheave support head pivot 42, paired trunnion-sheaves 12 and 14, support head for trunnion sheaves 62 and winch-cable 26 with hook 24. The basic winch-apparatus construction consists of winch-drum 16 (also referred to as a spool) that rotates about a winch-drum axle to play-out or wind-up winch-cable 26 the inner end of which is anchored to winch-drum 16. Basic winch/cable construction is well-known in the art, and will not be discussed further here. In the embodiment illustrated, the winch-apparatus is powered by hydraulics, but could just as well be powered by electric, pneumatic, internal combustion drives or manually. The type of power chosen does not change the principles of the invention and all such power sources, including solar and others not so identified herein are contemplated for use with the invention. Support 2 is designed with storage space for housing trunnion-sheave winch-apparatus 10, which in this example, is easily accessed on the upward facing surface of support 2.

Figure 2:
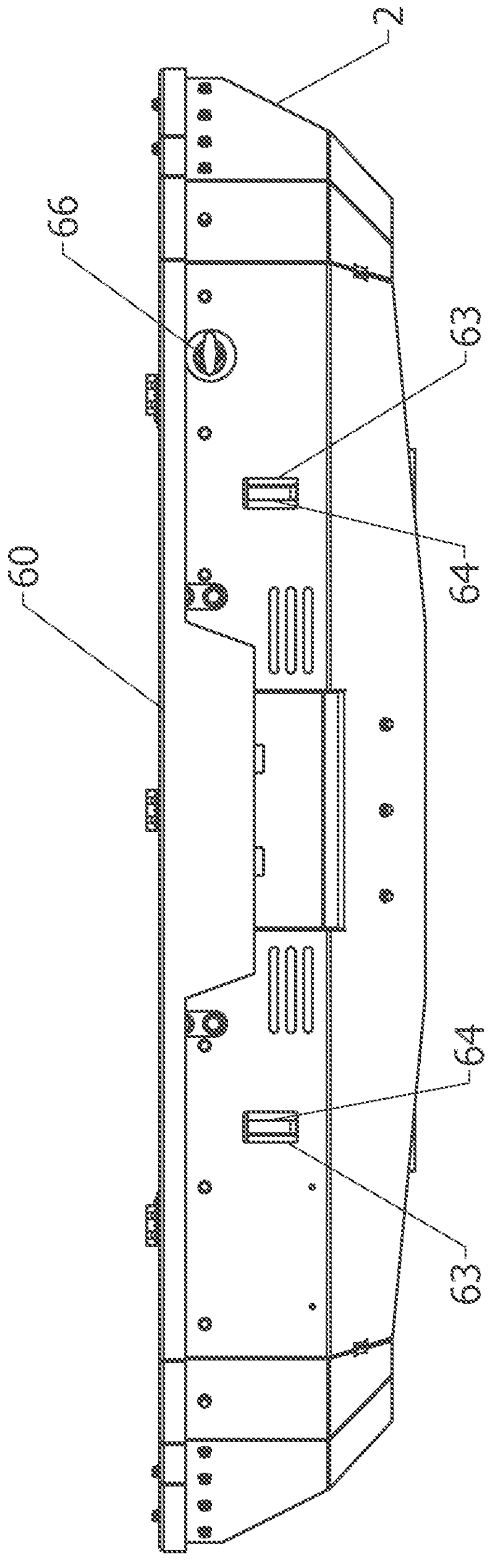
FIG. 2 is a 3-dimensional view of a working model of the trunnion-sheave winch-apparatus of FIG. 1.

FIG. 2, a 3-dimensional view, illustrates a working model of the trunnion-sheave winch-apparatus encased in its support 2 storage space protected by cover 60. Illustrated on the front side of this embodiment of the trunnion-sheave winch-apparatus is winch release handle 66 for engaging shackle attachment device 64 to protrude through shackle attachment device opening 63.

Figure 3:
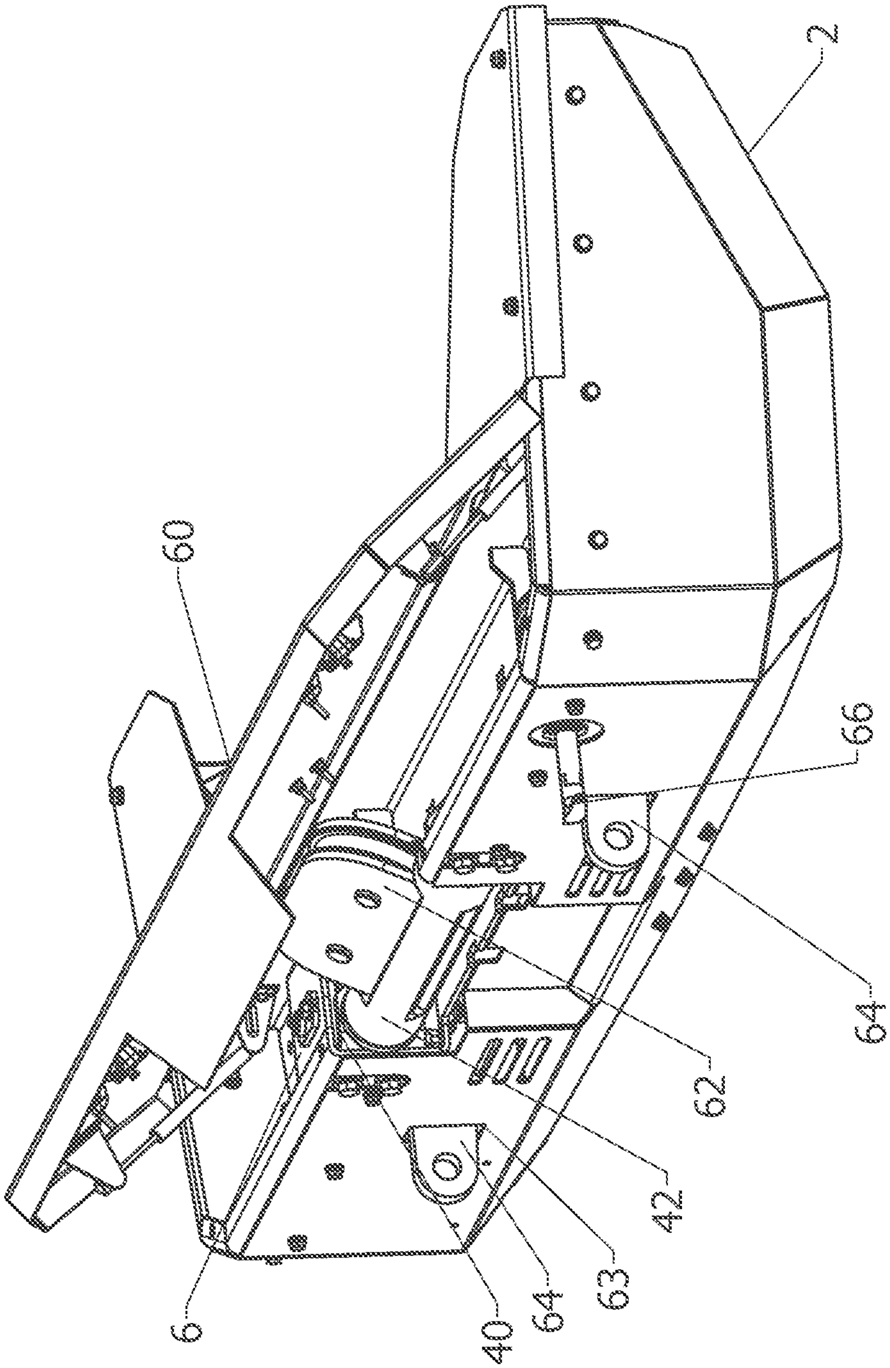
FIG. 3 is a 3-dimensional view of another orientation of the working model of the trunnion-sheave winch-apparatus of FIG. 2.

FIG. 3 illustrates cover 60 opening about hinges 70 (seen in FIG. 5) to reveal trunnion-sheave support head for trunnion sheaves 62 that protects and supports trunnion sheaves 12 and 14. In this figure, also illustrated is trunnion-sheave support head pivot 42 about which trunnion sheaves 12 and 14 and support head for trunnion sheaves 62 pivot. Support mount 40 affixes trunnion-sheave support head pivot 42, sheaves 12 and 14, and trunnion-sheave support head for trunnion sheaves 62 to support 2.

Figure 4:
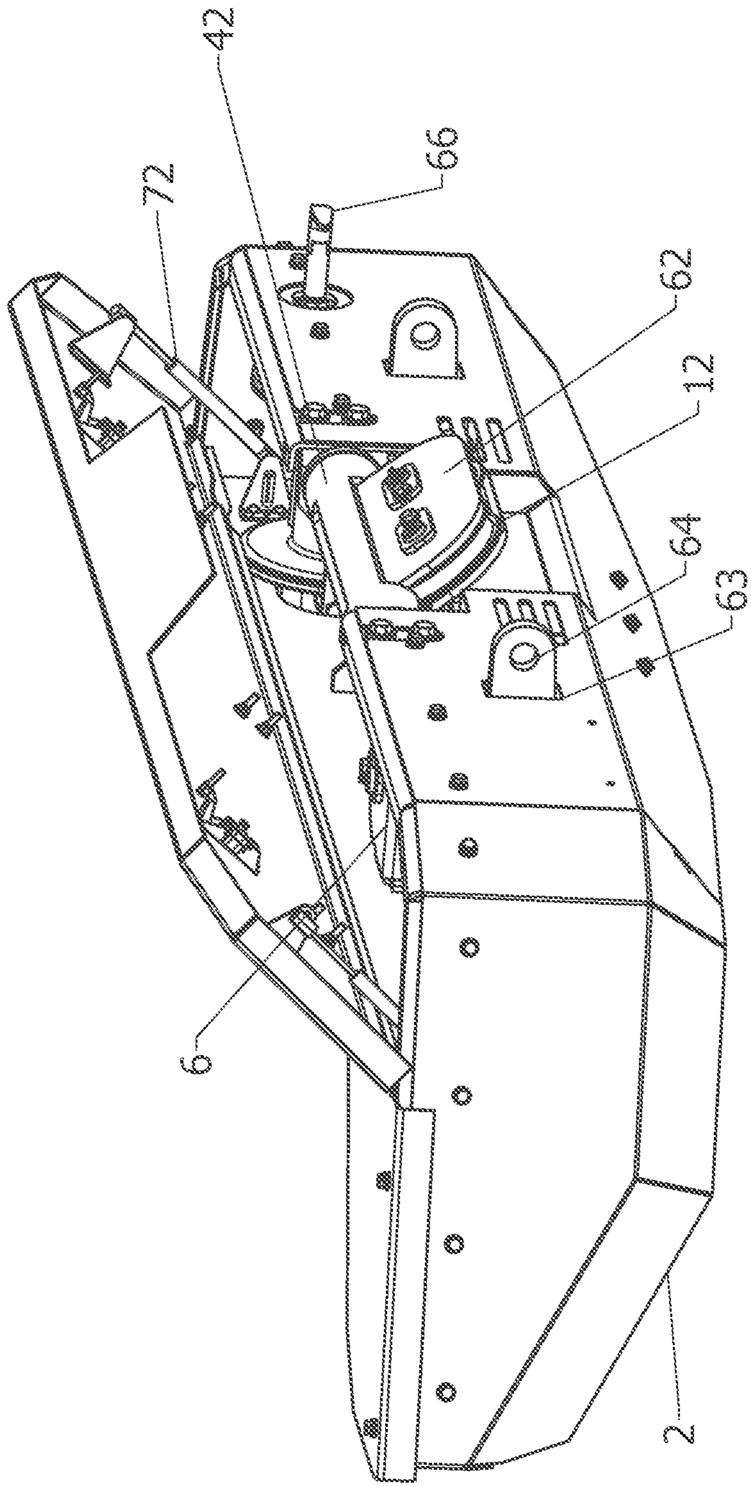
FIG. 4 is a 3-dimensional view of another orientation of the working model of the trunnion-sheave winch-apparatus of FIG. 3.

Gas strut 72, as shown in FIG. 4, is used to support cover 60. Also called out in this figure is optional single sheave 6.

Figure 5:
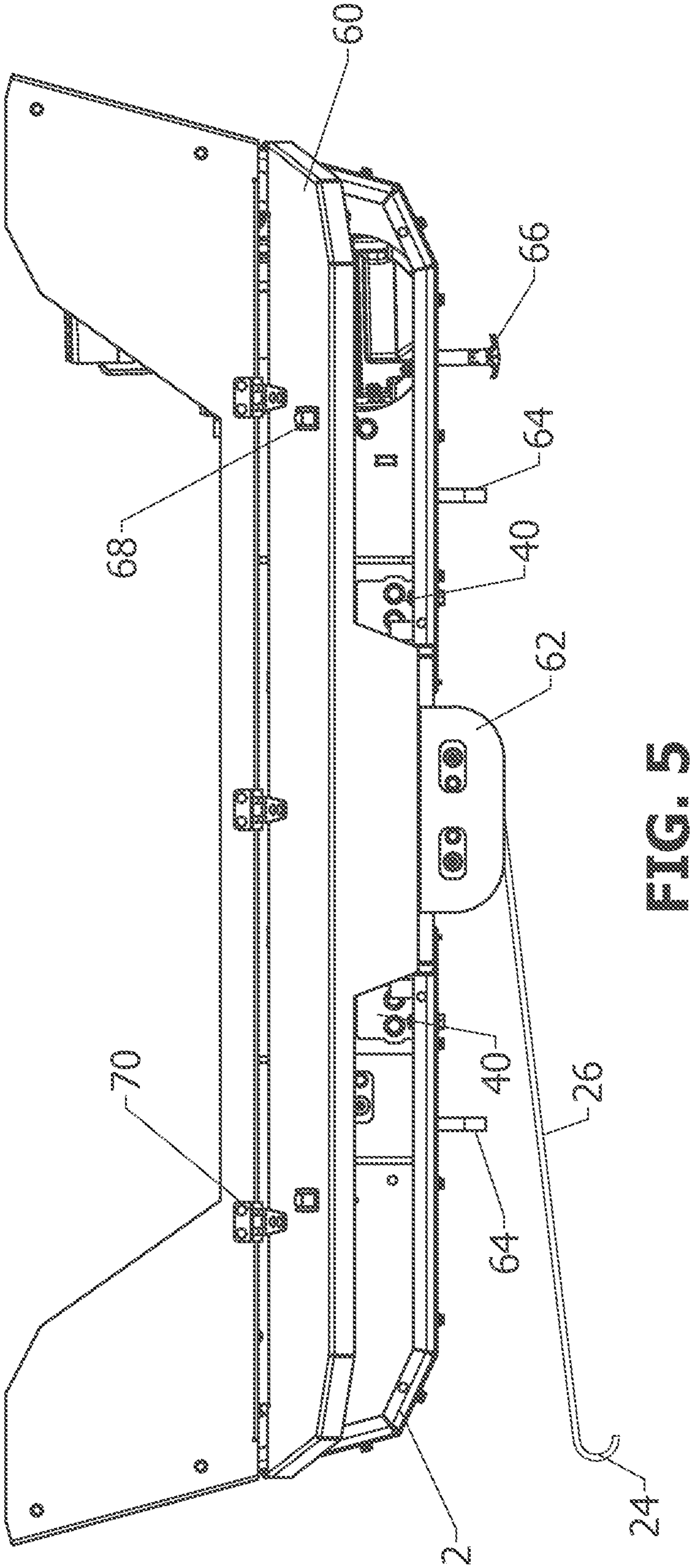
FIG. 5 is a 3-dimensional view of another orientation of the working model of the trunnion-sheave winch-apparatus of FIG. 4.

Trunnion-sheave winch-apparatus 10 is illustrated in FIG. 5 with, in this example, 100 feet of 3/8 cable with hook 24 ready for use. It is important to note that the winch cable of this invention has a full 180° of play as suggested by the position of cable 26. To see the trunnion-sheave winch-apparatus at work, the reader is directed to https://www.youtube.com/watch?v=GmzoQncvXOA.

Figure 6:
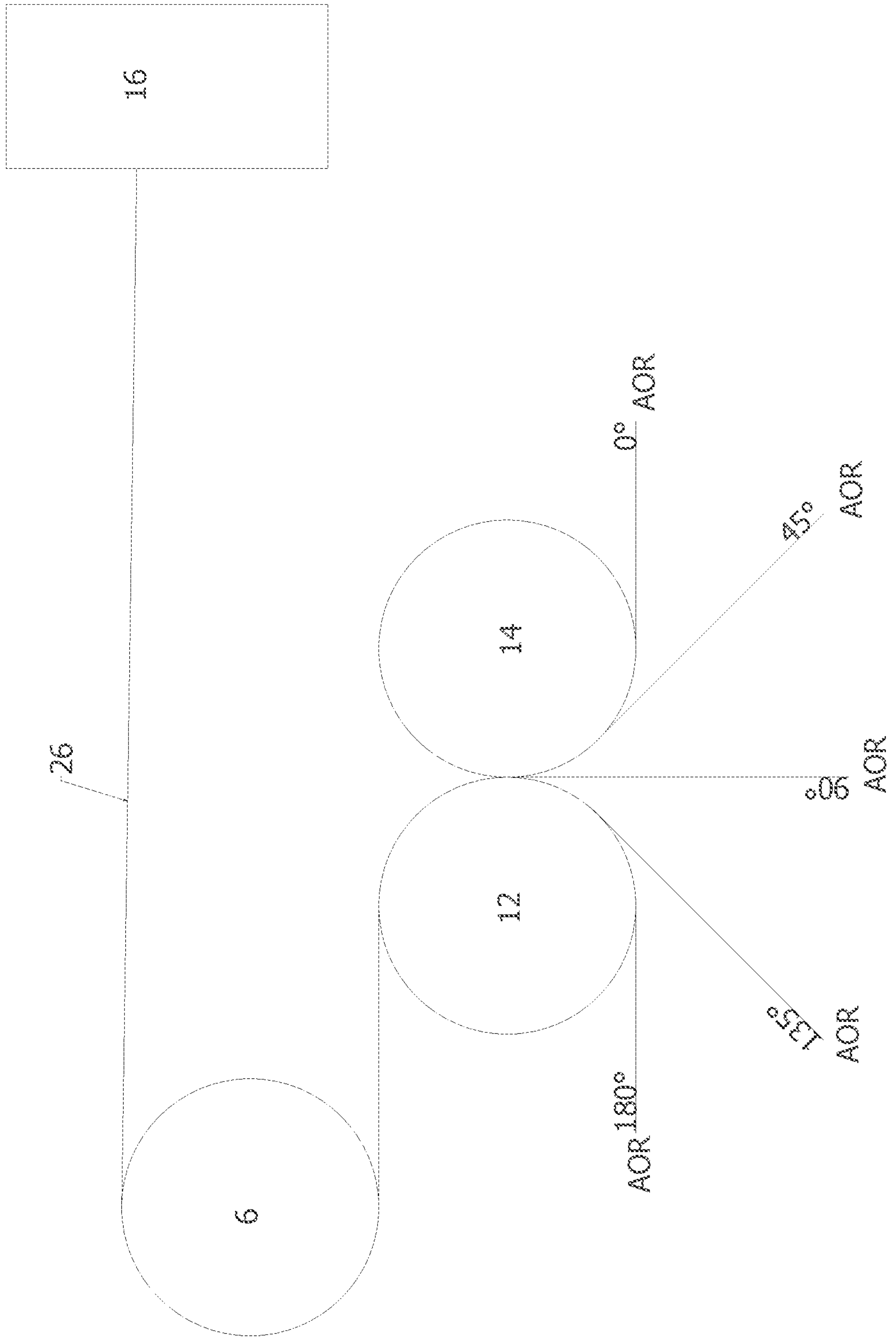
FIG. 6 is a graphical view showing how a winch-cable always maintain a minimum of 90° contact with the Trunnion-sheave wheels regardless of the angle of recovery.

FIG. 6 illustrates how winch-cable 26 always is maintained in a minimum of 90° contact with trunnion-sheaves 12 and 14 regardless of the "angle of recovery" AoR. This maintenance of a minimum of 90° contact with the trunnion-sheaves 12 and 14 regardless of the angle of recovery eliminates cable binding as the cable is put into play regardless of how the object is positioned with reference to the recovery vehicle, even when the cable is pulling an object in a direction that is perpendicular to the support. As mentioned above, if a cable becomes jammed as it is being rewound, it must be manually unjammed, and if the cable becomes jammed on the winch drum it must be unjammed from the drum and re-guided onto the drum evenly. The process may need to be repeated several times before the cable is completely wound on the drum. This is not only time consuming, costly, and annoying, but also may significantly reduce the life of the cable. In addition, there is always the danger that the cable will break or become significantly weakened presenting a serious hazard, especially when the vehicle being recovered is located on an incline. The situation becomes even more dangerous when there is no way to secure the object being recovered. In such a case, once a winch is attached to the object, it cannot be released from the object if it becomes jammed because the object, such as a vehicle, will roll down the incline. In addition, the weight of the vehicle, at times, can make it very difficult and even impossible for the cable to be unjammed. A related hazard occurs when the recovery operation destabilizes the recovery vehicle, in that the recovery operation can inadvertently cause the recovery vehicle to move. Such movement could be merely an inconvenience, but in certain situations, such movement could result in disaster and even death.

The paired trunnion-sheave winch-apparatus, in this example, is used by opening cover 60 to play out winch-cable 26 from winch-drum 16, winding it around sheave 6 and then positioning it through the grooves of the facing paired trunnion-sheaves 12 and 14, each of which rotates about its own axis 18 in opposing direction to the other. Winch-cable 26 continues to be played out until cable-hook 24, that is secured to the working end of winch-cable 26, is securely anchored to the object to be recovered. Using the recovery vehicle's power apparatus, winch-cable 26 is then tensioned to move the object to be recovered. In the embodiment shown, the winch-apparatus is an 8,000 lb. hydraulic plantary winch. Tensioning winch-cable 26 requires rewinding winch-cable 26 on drum 16 until the desired tension is realized. The trunnion-sheave winch-apparatus of the present invention causes smooth rewinding eliminating (as described above) the need to stop, out-wind and rewind multiple times in order to untangle a tangled winch-cable. This advantage, in turn, prevents damage to the winch-cable and, thus increases the life span of the winch-cable. It is important to understand and note that the paired trunnion-sheaves change the direction of the applied force, transmit rotational motion, and/or realize a mechanical advantage in either or both linear and rotational motion to provide for even winding of the winch-cable on the drum and to eliminate winch-cable binding. The use of the paired trunnion-sheaves provides for the redirection of the pulling force to enhance even winding of the cable on the drum and to eliminate cable binding. Direction-changing paired trunnion-sheaves 12 and 14 guide the winch-cable so that as the winch-cable is brought into play it is always maintained at a minimum of 90° contact within the paired trunnion-sheave wheels enabling a recovery-device that is fitted with a winch-apparatus of the present invention to recover an object regardless of the position of that object in relation to the recovery-device without binding of the winch-cable on the winch-drum. This means that positioning and repositioning of a recovery vehicle so that the object to be recovered is in perfect perpendicular alignment with the recovery support is no longer required. In currently available winch recovery systems, if the object to be recovered is situated so that the recovery vehicle cable cannot be fed to the cable drum so that it is perpendicular to the rotational axis of the drum, the cable will likely become jammed and possibly damaged. Once jammed, the cable must be manually unjammed and manually guided onto the drum. This process likely will need to be repeated several times before the cable is completely wound on the drum. However, the vertical-axis, paired trunnion-sheaves 12 and 14 cause the recovery vehicle to recover an object regardless of the position of that object in relation to the recovery vehicle.

When the trunnion-sheave winch-apparatus is not in use, it is simply rotated up into its protective cavity 22 for secure, enclosed protection from the elements and from being subject to other types of damage.

Another part of trunnion-sheave winch-apparatus 10, in this example, is a hydraulically-powered retractable recovery stabilizing apparatus. It is to be understood that the retractable recovery stabilizing apparatus may be powered by any other form of power, including but not limited to electric, solar, and battery. Stabilizing apparatus has at least two elongated stabilizer support legs with one end of each support leg connected to the bottom of the support by a swivel connector and the opposing end of each support leg being provided with foot-pad for secure, non-skid placement on the ground surface. In the vicinity of the midpoint of each leg is attached a piston-controlled hinge that is also attached to the bottom of the support to provide for remote control raising and lowering of the support legs. Also, optional, are O-rings positioned in cavities recessed into the outwardly facing surface of the support to provide for extra line connection, if desired.

The foregoing description, for purposes of explanation, uses specific and defined nomenclature to provide a thorough understanding of the invention. However, it will be apparent to one skilled in the art that the specific details are not required in order to practice the invention. Thus, the foregoing description of the specific embodiment is presented for purposes of illustration and description and is not intended to be exhaustive or to limit the invention to the precise form disclosed. Those skilled in the art will recognize that many changes may be made to the features, embodiments, and methods of making the embodiments of the invention described herein without departing from the spirit and scope of the invention. For example, when the support is a bumper or the like on a recovery vehicle, it may be used on the front, the rear, or both ends of a recovery-device. The support may be made of any material into which the above described cavities may be formed, as long as the material provides the durability required by a recovery vehicle. Furthermore, the present invention is not limited to the described methods, embodiments, features or combinations of features but include all the variation, methods, modifications, and combinations of features within the scope of the appended claims. The invention is limited only by the claims.

What is claimed is:

1. A winch apparatus, comprising:

a cable unwinding/rewinding mechanism having a cable attached thereon;

a first sheave spaced apart from the cable unwinding/rewinding mechanism, the first sheave having an annular groove therein, the annular groove arranged substantially on a first plane; and, two horizontally aligned trunnion sheaves adjacently arranged, each of the two horizontally aligned trunnion sheaves having an annular groove therein, the respective annular grooves of the two horizontally aligned trunnion sheaves forming a cable channel adapted to maintain a minimum circumferential cable-to-trunnion sheave contact of 90° along an angle of recovery range for the cable of about 180° ;

each of the two horizontally aligned trunnion sheaves adapted to change the direction of the applied force on the cable, transmit consistent rotational motion as the cable is unwound/rewound, afford mechanical advantage in either or both linear and rotational motion, and facilitate even winding of the cable onto a winch drum of the cable unwinding/rewinding mechanism;

the two horizontally aligned trunnion sheaves rotatable along a trunnion-sheave support head pivot, the trunnion-sheave support head pivot having an axis of rotation parallel to the first plane and perpendicular to the cable channel, wherein the cable is arranged to be seated at least partially within the annular groove of the first sheave and within the cable channel.

2. The winch apparatus recited in claim 1 further comprising:

a housing having a first surface and having the first sheave rotatably mounted thereon; and, a rotatable housing pivotably mounted to the first surface and having the two horizontally aligned trunnion sheaves mounted within the rotatable housing.

3. The winch apparatus recited in claim 1, wherein the cable unwinding/rewinding mechanism is a hydraulically powered winch.

4. The winch apparatus recited in claim 1 wherein the winch apparatus is attached to a tow truck.

5. The winch apparatus recited in claim 1 wherein the two horizontally aligned trunnion sheaves have substantially the same radius.

* * * * *